(12) United States Patent
Iwasaki

(10) Patent No.: US 6,232,761 B1
(45) Date of Patent: May 15, 2001

(54) FREQUENCY ESTIMATING SYSTEM

(75) Inventor: Motoya Iwasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/405,008

(22) Filed: Sep. 27, 1999

(30) Foreign Application Priority Data

Sep. 28, 1998 (JP) .................................................. 10-273556

(51) Int. Cl.$^7$ ........................ G01R 23/165; G01R 23/02; H04L 27/14; H04L 27/06
(52) U.S. Cl. ........................ 324/76.44; 327/47; 375/326; 375/340
(58) Field of Search ........................ 324/76.44; 375/344, 375/326; 327/47

(56) References Cited

U.S. PATENT DOCUMENTS

| | | | |
|---|---|---|---|
| 5,812,611 | * 9/1998 | Sogabe | 375/344 |
| 6,016,329 | * 1/2000 | Iwasaki | 375/340 |

FOREIGN PATENT DOCUMENTS

| | | |
|---|---|---|
| 5-244210 | 9/1993 | (JP) . |
| 2540931 | 7/1996 | (JP) . |
| 9-214293 | 8/1997 | (JP) . |

* cited by examiner

Primary Examiner—Glenn W. Brown
Assistant Examiner—Anjan Deb
(74) Attorney, Agent, or Firm—McGuireWoods, LLP

(57) ABSTRACT

An inverse modulator 21, a Fourier transform circuit 22 and a power converter 23 are provided for obtaining a power-frequency spectrum of the carrier wave of a received signal, which is subjected to the influence of fading in the transmission line. A peak detector obtains a peak power level from the power-frequency spectrum and also obtains a peak power level frequency corresponding to the peak power level. A first and a second lower power level frequency detector 25 and 26 receive the power-frequency spectrum, the peak power level and the peak power level frequency. The first lower power level frequency detector detects a frequency which is higher than the peak power level frequency and corresponds to a power level lower than the peak power level by 120 dB, as a first lower power level frequency. The second lower power level frequency detector detects a frequency, which is lower than the peak power level frequency and corresponds to a power level lower than the peak power level by 10 dB, as a second lower power level frequency. An averaging circuit 27 obtains an estimated center frequency of the carrier wave by averaging the first and second lower power level frequencies.

10 Claims, 5 Drawing Sheets

FREQUENCY ESTIMATING SYSTEM

BACKGROUND OF THE INVENTION

The present invention relates to a frequency estimating system for estimating a center frequency of the carrier wave of a received signal.

As the frequency estimating system of this kind, one as shown in FIG. 6 is well known in the art. The illustrated frequency estimating system comprises a modulated component removing circuit 11, a Fourier transforming circuit 12, a power converting circuit 13 and a peak detecting circuit 14. A received signal having an unknown carrier frequency, for instance, is coupled via an antenna (not shown) to the modulated component removing circuit 11. The modulated component removing circuit 11 removes a modulated component from the received signal to obtain a non-modulated signal. The Fourier transform circuit 12 performs Fourier transform of the non-modulated signal and outputs the result as a frequency spectrum component. The power converting circuit 13 performs power conversion of the frequency spectrum component to feed a resultant power-frequency spectrum to the peak detecting circuit 14. The peak detecting circuit 14 detects the peak power level in the power-frequency spectrum and outputs a frequency corresponding to the peak power level as an estimated center frequency fp.

In the frequency estimating system shown in FIG. 6, it is possible to accurately estimate the center frequency when the received signal is not subjected to fading or the like. However, when the received signals exposed to rice fading or the like so that its carrier wave component has a spread frequency range, right center frequency may not be estimated.

Taking the rice fading as an example, when the received signal is subjected to the rice fading during transmission, a fading component subjected to external disturbance by irregular reflection and a straight component not subject to any external disturbance are combined, and the resultant signal is received. In a mobile communication system or the like, in which a terminal (i.e., a mobile terminal) is moved at a high speed and receives great influence of the Doppler effect, the fading component and the center frequency of the straight component may fail to be coincident with each other.

For example, in a GSM system the received signal has a carrier wave spectrum as shown in FIG. 7. As shown, the fading component and the center frequency of the straight component fail to be coincident. In the demodulation such that a received signal with a deviation between the fading component and the center frequency of the straight component, the best characteristic can be obtained when the received signal is inputted to a demodulator such that the center frequency of the fading component is zero. To make the fading component center frequency zero, estimation thereof is necessary. In the case of using the frequency estimating system as shown in FIG. 6, that is, in the case of detecting the peak of the carrier wave component, the frequency of the straight component is obtained as the estimated frequency (i.e., center frequency). In other words, when the received signal is subjected to fading during transmission, its carrier wave center frequency can not be accurately detected.

SUMMARY OF THE INVENTION

An object of the present invention is to provide a frequency estimating system capable of accurate estimation of the received signal carrier wave center frequency even when the received signal is subjected to the influence of fading or the like in the transmission line.

According to an aspect of the present invention, there is provided a frequency estimating system for estimating a center frequency of carrier wave of a received signal subjected to the influence of fading in the transmission line, comprising a first means for obtaining power-frequency spectrum of the carrier wave of the received signal, a second means for obtaining a peak power level from power-frequency spectrum of the carrier wave and obtaining a peak power level frequency corresponding to the peak power level, and a third means for receiving the carrier wave power-frequency spectrum, the peak power level and the peak power level frequency, detecting a frequency, which is higher than the peak power level frequency and having a power level lower than the peak power level by a predetermined value, as a first lower power level frequency, detecting a frequency, which is lower than the peak power level frequency and having a power level lower than the peak power level by the predetermined value, as a second lower power level frequency, and a third means for obtaining the estimated center frequency by averaging the first and second lower power level frequencies.

The predetermined value may be 10 dB.

The third means includes a first detector for detecting the first lower power level frequency, a second detector for detecting the second lower power level frequency, and an averaging circuit for obtaining the center frequency by averaging the first and second lower power level frequencies.

The received signal contains a predetermined fixed signal series inserted therein, and the first means includes an inverse modulator for inversely modulating the received signal according to the fixed signal series to obtain a non-modulated signal free from any modulated component, a Fourier transform circuit for executing Fourier transform of the non-modulated signal to obtain a frequency spectrum, and a power converter for power converting the frequency spectrum to obtain the power-frequency spectrum.

The first means includes a demodulator for demodulating the received signal to obtain a demodulated signal, an inverse modulator for inversely modulating the received signal according to the demodulated signal to obtain a non-modulated signal free from any modulated component, a Fourier transform circuit for executing Fourier transform of the non-modulated signal to obtain a frequency spectrum, and a power converter for power converting the frequency spectrum to obtain the power-frequency spectrum.

The first means includes a frequency multiplier for frequency multiplying the received signal to obtain a non-modulated signal free from any modulated component, a Fourier transform circuit for executing Fourier transform of the non-modulated signal to obtain a frequency spectrum, and a power converter for power converting the frequency spectrum to obtain the power-frequency spectrum.

According to an aspect of the present invention, there is provided a frequency estimating method comprising steps of: obtaining a peak power level from power-frequency spectrum of carrier wave of received signal; obtaining a first and second frequencies having higher and lower than the peak power level frequency and having a power level lower than the peak power level by a predetermined value; and obtaining an estimated center frequency by averaging the first and second frequencies.

According to another aspect of the present invention, there is provided a frequency estimating method comprising steps of: obtaining a non-modulated signal free from any modulated component by inversely modulating a received signal on the basis of a predetermined fixed signal series inserted in the received signal; obtaining a peak power level from power-frequency spectrum of carrier wave of the received signal based on the non-modulated signal; obtaining a first and second frequencies having higher and lower than the peak power level frequency and having a power level lower than the peak power level by a predetermined value; and obtaining an estimated center frequency by averaging the first and second frequencies.

According to other aspect of the present invention, there is provided a frequency estimating method comprising steps of: demodulating a received signal to obtain a demodulated signal; inversely modulating the received signal according to the demodulated signal to obtain a non-modulated signal free from any modulated component; obtaining a peak power level from power-frequency spectrum of carrier wave of the received signal based on the non-modulated signal; obtaining a first and second frequencies having higher and lower than the peak power level frequency and having a power level lower than the peak power level by a predetermined value; and obtaining an estimated center frequency by averaging the first and second frequencies.

According to still other aspect of the present invention, there is provided a frequency estimating method comprising steps of: frequency multiplying a received signal to obtain a non-modulated signal free from any modulated component; obtaining a peak power level from power-frequency spectrum of carrier wave of the received signal based on the non-modulated signal; obtaining a first and second frequencies having higher and lower than the peak power level frequency and having a power level lower than the peak power level by a predetermined value; and obtaining an estimated center frequency by averaging the first and second frequencies.

In the frequency estimating method the predetermined value may be 10 dB.

Other objects and features will be clarified from the following description with reference to attached drawings.

PREFERRED EMBODIMENTS OF THE INVENTION

Preferred embodiments of the present invention will now be described with reference to the drawings.

Figure 1:
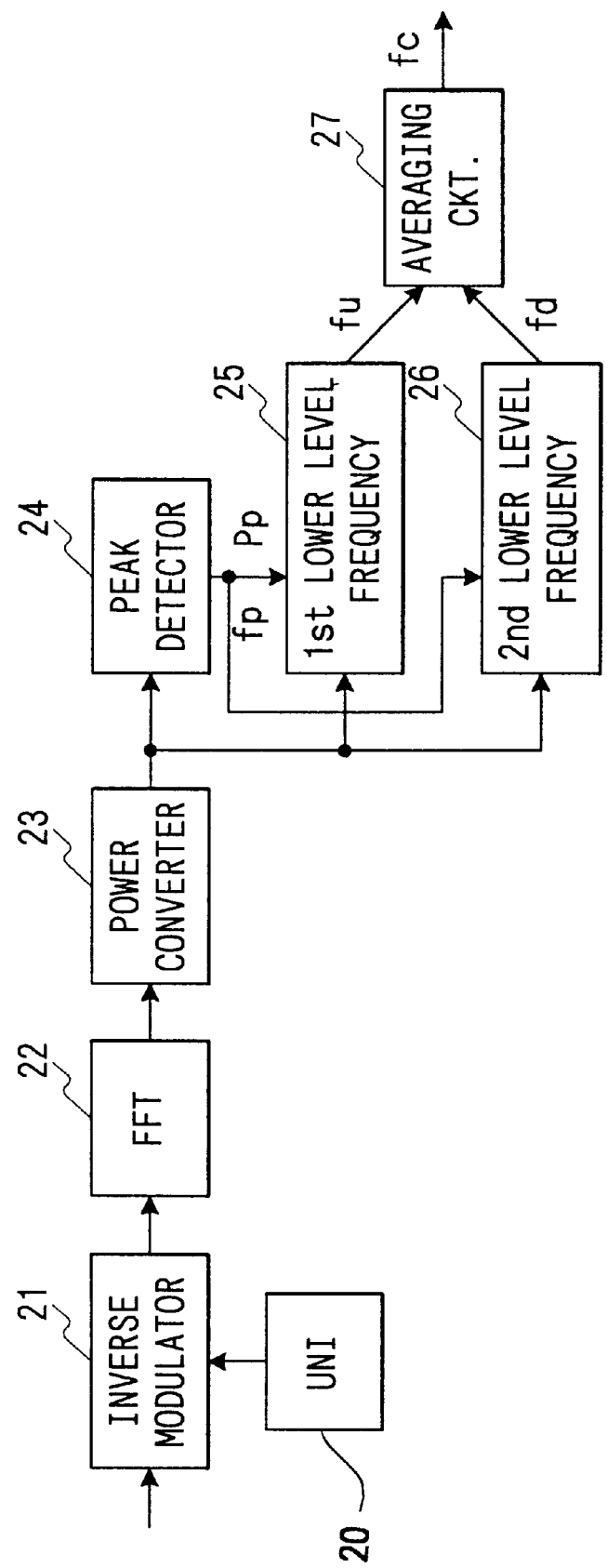
FIG. 1 shows a block diagram of a first embodiment of the frequency estimating system according to the present invention.

Referring to FIG. 1, the illustrated frequency estimating system comprises an inverse modulator 21, Fourier transforming circuit 22, a power converter 23, a peak detector 24, a first and a second lower power level frequency detector 25 and 26 and an averaging circuit 27. In the illustrated example, it is assumed that a predetermined signal series or a so-called unique word are inserted in the received signal and that the timing of receiving the unique word on the receiving side is known.

The received signal is supplied to the inverting amplifier 21, and a unique word is also supplied thereto separately. The inverse modulator 21 inversely modulates a unique ward portion of the received signal to remove the modulated component and obtain a non-modulated signal. The Fourier transform circuit 22 performs Fourier transform of the non-modulated signal. The power converter 23 power converts each frequency component of the output of the Fourier transform circuit 22, thus obtaining a power-frequency spectrum.

Figure 2:
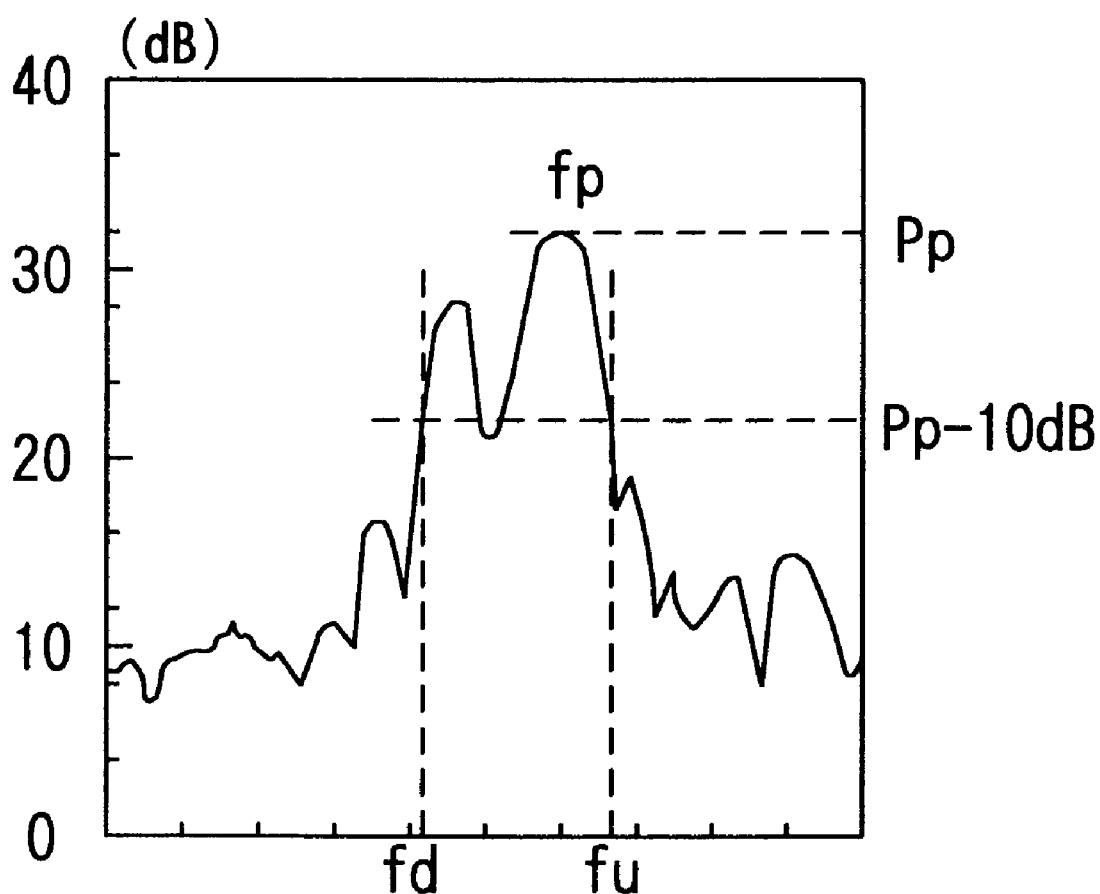
FIG. 2 shows an example of power spectrum obtained by the power converter.

FIG. 2 shows an example of the power-frequency spectrum obtained in this way. As shown, the power-frequency spectrum is spread due to the fading, and its center frequency is not coincident with the peak power level frequency.

The peak detector 24 detects the peak power level (i.e. maximum power level) Pp in the power spectrum, and obtains a frequency fp corresponding to the detected peak power level Pp. The peak detector 24 supplies the frequency (i.e., peak power level frequency) fp and the peak power level Pp to the first and second lower power level frequency detectors 25 and 26. The power converter 23 feeds the power spectrum to the first and second lower power level frequency detectors 25 and 26.

In this embodiment, the predetermined value is prescribed to be at a point of −10 dB. The first predetermined value detector 25 detects a frequency, which is higher than the peak power level frequency fp and having a power level lower than the peak power level Pp by 10 dB, as a first lower power level frequency fu. That is, the first lower power level frequency detector 25 detects the first lower power level frequency fu higher than the peak power level frequency and corresponding to the power level (Pp−10 dB).

The second lower power level frequency detector 26 detects a frequency which is lower than the peak power level frequency Pp and corresponding to a power level lower than the peak power level Pp by 10 dB, as a second lower power level frequency fd. That is, the second lower power level frequency detector 26 detects the second lower power level frequency fd lower than the peak power level frequency fp and having the power level (Pp−10 dB).

The first and second lower power level frequencies fu and fd are supplied to the averaging circuit 27. The averaging circuit 27 obtains the mean frequency of the first and second lower power level frequencies fu and fd, and outputs the mean frequency as an estimated center frequency fc of the received signal carrier wave. The first and second lower power level frequencies fu and fd correspond to the opposite edge frequencies of the spread carrier wave frequency range, and their mean frequency (fu+fd)/2 substantially coincides with the center frequency fc.

Figure 3:
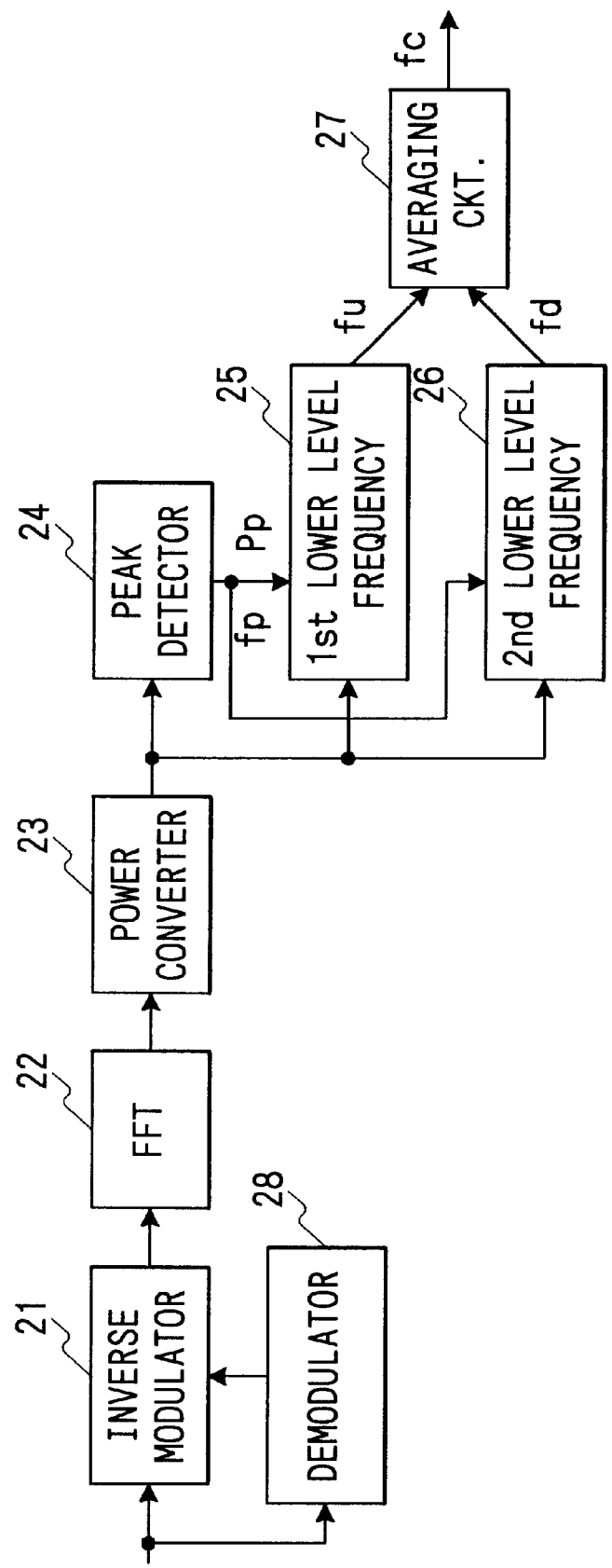
FIG. 3 shows a block diagram of a second embodiment of the frequency estimating system according to the present invention.

A different embodiment of the frequency estimating system according to the present invention will now be described with reference to FIG. 3. In the Figure, components like those in the frequency estimating system shown in FIG. 2 are designated by like reference numerals, and are not described.

The illustrated frequency estimating system is applied to the case where the received signal contains no fixed pattern (or unique word). In this embodiment, a demodulator 28 is additionally provided. The received signal is coupled to the inverse modulator 21 and the demodulator 28. The demodulator 28 demodulates the received signal and feeds the resultant demodulated signal to the inverse modulator 21. The inverse modulator 21 inversely modulates the received signal with the demodulated signal to remove the modulated component, and feeds the resultant non-modulated signal to the Fourier transform circuit 22. The subsequent process is the same as described before in connection with FIG. 2, and will not be described.

Figure 4:
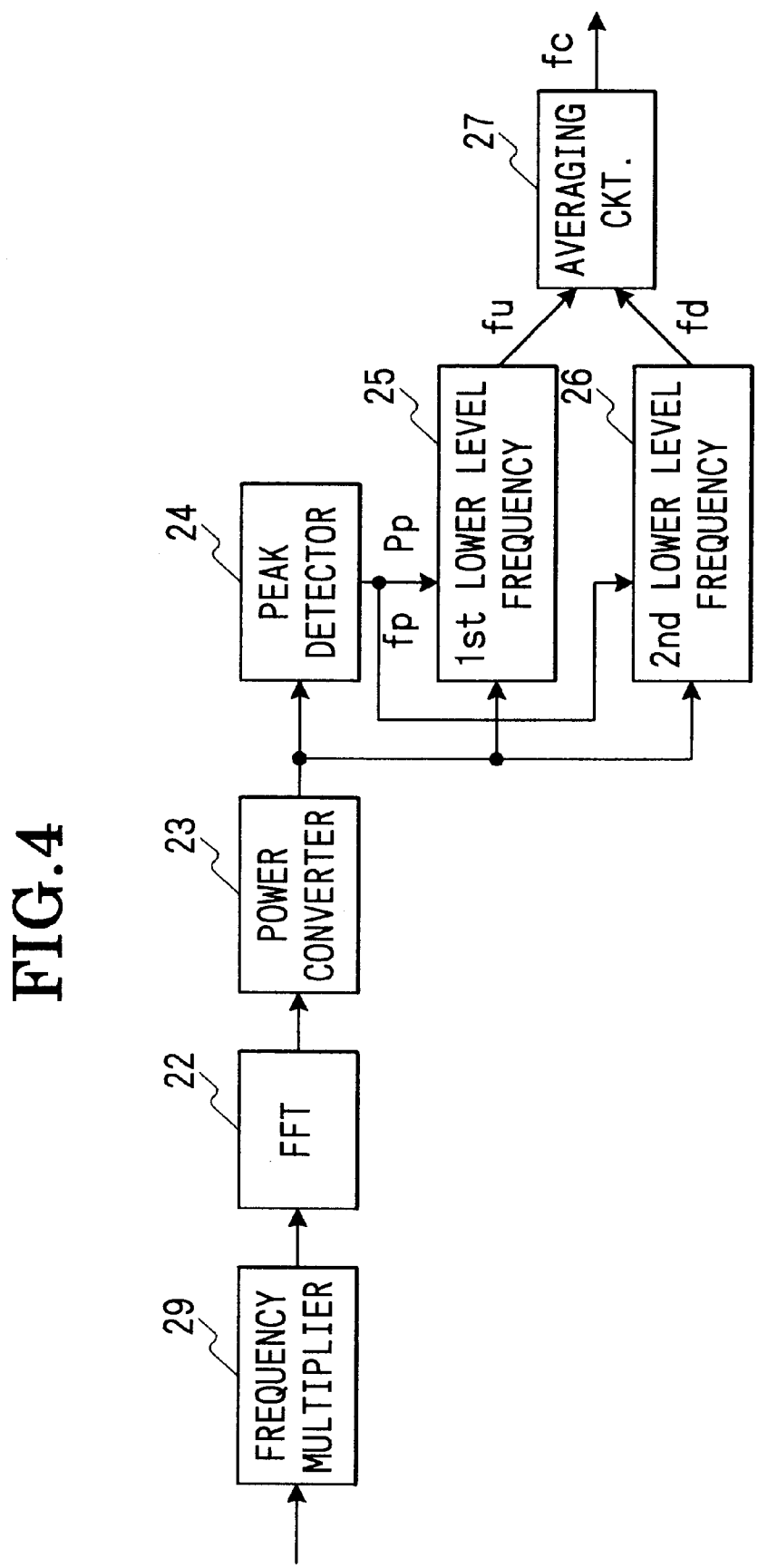
FIG. 4 shows a block diagram of a third embodiment of the frequency estimating system according to the present invention.

A further embodiment of the frequency estimating system according to the present invention will be described with reference to FIG. 4. In the Figure, components like those in the frequency estimating system as shown in FIG. 2 are designated by like reference numerals, and will not be described.

Again the illustrated frequency estimating system is used in the case where the received signal contains no fixed pattern (or unique word). In this embodiment, a frequency multiplier 29 is provided instead of the inverse modulator 21. The frequency multiplier 29 frequency multiplies the received signal to remove the modulated component, and supplies the non-modulated component to the Fourier transform circuit 22. The subsequent processing is the same as described before, and will not be described.

Figure 5:
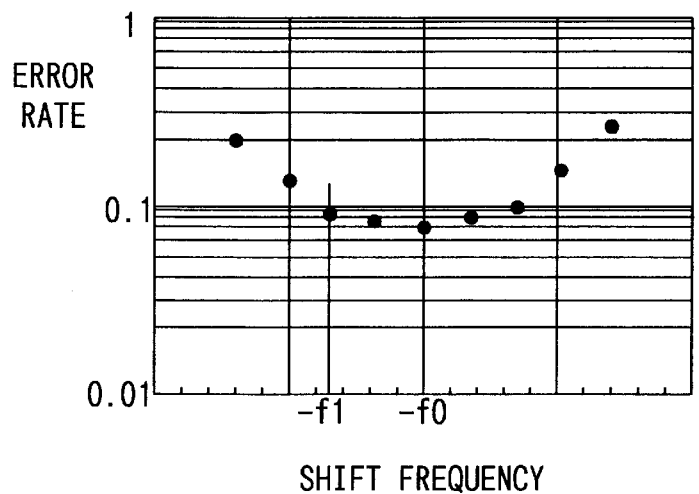
FIG. 5 shows a relationship between the shift frequency and error rate.
Figure 6:
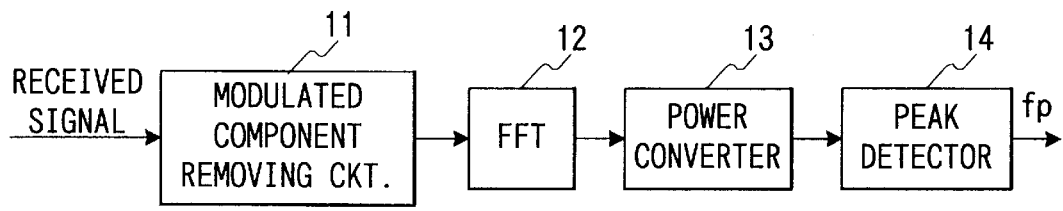
FIG. 6 shows a block diagram of an exemplified prior art frequency estimating system.
Figure 7:
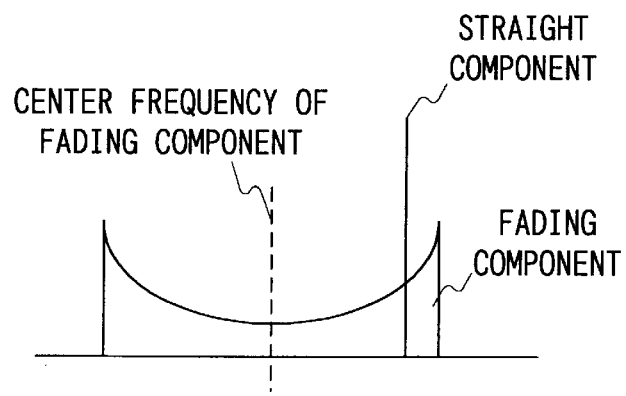
FIG. 7 shows a carrier wave spectrum.

FIG. 5 shows an error rate characteristic plotted against the shift frequency of the received signal. Referring to the Figure, labeled f0 is the center frequency of the spread frequency range of the received signal due to the fading, and labeled −f1 is the peak power level frequency. As is seen from FIG. 5, the characteristic is the best when the shift frequency f is −f0. It will be seen that the error rate characteristic can be improved by estimating the center frequency of the received signal subjected to the fading with either of the frequency estimating systems described above and compensating the frequency of the received signal according to the result of the estimation.

As has been described in the foregoing according to the present invention accurate received signal center frequency estimation can be obtained even when the received signal is subjected to the influence of fading, and the error rate characteristic can be improved by frequency compensating the received signal according to the result of the estimation.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A frequency estimating system for estimating a center frequency of carrier wave of a received signal subjected to the influence of fading in the transmission line, comprising:
   means for obtaining power-frequency spectrum of the carrier wave of the received signal;
   peak detection means for obtaining a peak power level from the power-frequency spectrum of the carrier wave and obtaining a peak power level frequency corresponding to the peak power level; and
   first frequency level detection means for detecting a first frequency, which is higher than the peak power level frequency and having a power level lower than the peak power level by a predetermined value, as a first lower power level frequency;
   second frequency level detection means for detecting a second frequency, which is lower than the peak power level frequency and having a power level lower than the peak power level by the predetermined value, as a second lower power level frequency; and
   averaging means for obtaining the estimated center frequency by averaging the first and second lower power level frequencies.

2. The frequency estimating system according to claim 1, wherein the predetermined value is 10 dB.

3. The frequency estimating system according to claim 1, wherein the received signal contains a predetermined fixed signal series inserted therein, said means for obtaining power-frequency spectrum comprises:
   an inverse modulator for inversely modulating the received signal according to the fixed signal series to obtain a non-modulated signal free from any modulated component;
   a Fourier transform circuit for executing Fourier transform of the non-modulated signal to obtain a frequency spectrum; and
   a power converter for power converting the frequency spectrum to obtain the power-frequency spectrum.

4. The frequency estimating system according to claim 1, wherein said means for obtaining power-frequency spectrum comprises:
   a demodulator for demodulating the received signal to obtain a demodulated signal;
   an inverse modulator for inversely modulating the received signal according to the demodulated signal to obtain a non-modulated signal free from any modulated component;
   a Fourier transform circuit for executing Fourier transform of the non-modulated signal to obtain a frequency spectrum; and
   a power converter for power converting the frequency spectrum to obtain the power-frequency spectrum.

5. The frequency estimating system according to claim 1, wherein said means for obtaining power-frequency spectrum comprises:
   a frequency multiplier for frequency multiplying the received signal to obtain a non-modulated signal free from any modulated component;
   a Fourier transform circuit for executing Fourier transform of the non-modulated signal to obtain a frequency spectrum; and
   a power converter for power converting the frequency spectrum to obtain the power-frequency spectrum.

6. A frequency estimating method comprising steps of:
   obtaining a peak power level from power-frequency spectrum of carrier wave of received signal;
   obtaining a first and second frequencies respectively having higher and lower than the peak power level frequency and having a power level lower than the peak power level by a predetermined value; and
   obtaining an estimated center frequency by averaging the first and second frequencies.

7. The frequency estimating method according to claim 6, wherein the predetermined value is 10 dB.

8. A frequency estimating method comprising steps of:
   obtaining a non-modulated signal free from any modulated component by inversely modulating a received signal on the basis of a predetermined fixed signal series inserted in the received signal;

obtaining a peak power level from power-frequency spectrum of carrier wave of the received signal based on the non-modulated signal;

obtaining a first and second frequencies respectively having higher and lower than the peak power level frequency and having a power level lower than the peak power level by a predetermined value; and obtaining an estimated center frequency by averaging the first and second frequencies.

9. A frequency estimating method comprising steps of:

demodulating a received signal to obtain a demodulated signal;

inversely modulating the received signal according to the demodulated signal to obtain a non-modulated signal free from any modulated component;

obtaining a peak power level from power-frequency spectrum of carrier wave of the received signal based on the non-modulated signal;

obtaining a first and second frequencies respectively having higher and lower than the peak power level frequency and having a power level lower than the peak power level by a predetermined value; and obtaining an estimated center frequency by averaging the first and second frequencies.

10. A frequency estimating method comprising steps of:

frequency multiplying a received signal to obtain a non-modulated signal free from any modulated component;

obtaining a peak power level from power-frequency spectrum of carrier wave of the received signal based on the non-modulated signal;

obtaining a first and second frequencies respectively having higher and lower than the peak power level frequency and having a power level lower than the peak power level by a predetermined value; and obtaining an estimated center frequency by averaging the first and second frequencies.

* * * * *